Patented Oct. 26, 1926.

1,604,630

UNITED STATES PATENT OFFICE.

HENRY BLUMENBERG, JR., OF LOS ANGELES, CALIFORNIA, ASSIGNOR TO STOCK-HOLDERS SYNDICATE, OF LOS ANGELES, CALIFORNIA, A CORPORATION OF CALIFORNIA.

PROCESS OF TREATING VANADIUM COMPOUNDS.

No Drawing. Application filed November 25, 1925. Serial No. 71,464.

My invention relates to the treatment of ores containing vanadium, and has for its object to provide a simple, economic and efficient method of recovering vanadium.

It is an object of this invention to recover vanadium compounds from solutions by the use of water insoluble carbo-hydrates and in particular oxy-cellulose.

The invention is based on my discovery that vanadium compounds in solution will combine with water insoluble carbo-hydrates, forming a carbo-hydrate vanadium combination which may then be removed from the mixture, dried and incinerated, or subjected to any other suitable or preferred method to recover the vanadium either in the shape of an oxide or salt.

My invention consists in the steps of the process hereinafter described and claimed:

While the process is of general application, the following is an example for extracting vanadium from crude calcium phosphate rock, which contains from a trace to one-half per cent of vanadium pentoxide $P_2O_5$. The phosphate rock may be treated in any suitable manner, such as mixing the finely ground rock with ammonium nitrate and sulphur dioxide to break down the phosphate rock and to form ammonium phosphate and calcium sulphite and calcium sulphate, the latter being formed by oxidation of the calcium sulphite. The vanadium in the phosphate rock will be converted to vanadium sulphate $V_2SO_4$, and vanadium nitrate, the latter being bluish in color. Impurities present in the phosphate rock, such as iron, aluminum and all other base metal compounds, with the exception of the alkali metal compounds which do not appear to interfere with the reaction, are removed by any suitable or preferred methods.

Oxy-cellulose is now added to the mixture, which is agitated from six to twenty-four hours. The vanadium sulphate and nitrate will combine with the oxy-cellulose forming therewith a greyish white mass, which is then removed from the mixture, dried in any preferred manner and incinerated, leaving the vanadium in the form of vanadium oxides in the resulting ash, or the vanadium cellulose combination may be treated in any other manner to recover the vanadium either in the form of an oxide, or salt, or in its pure metallic state.

The process is exceedingly efficient, cellulose combining with all the vanadium sulphate and nitrates present in the mixture, and the degree of dilution of the latter seems to be immaterial, the cellulose combining with the vanadium sulphate and nitrate in solutions that contain only one part of vanadium in one-thousand. It is also immaterial whether the solution is acid, as in the present case, neutral or alkaline, and it may be carried on at ordinary temperatures, although the present temperature is from 40 to 50° C. Any other form of oxy-cellulose may be used, such as can be produced from wood pulp, linen, paper, starches or any other water insoluble carbo-hydrates.

The vanadium salts of the lower state of oxidation apparently combine more rapidly with the oxy-cellulose than the other salts.

Various changes may be made in the steps of the process by those skilled in the art, without departing from the spirit of my invention, as claimed.

I claim:

1. A process of recovering vanadium comprising treating a vanadium compound solution with a water insoluble carbo-hydrate, thereby forming a vanadium carbo-hydrate combination.

2. A process of recovering vanadium comprising treating a vanadium compound solution with a water insoluble carbo-hydrate, thereby forming a vanadium carbo-hydrate combination, separating the vanadium carbo-hydrate combination from the mixture and removing the carbo-hydrate from the combination.

3. A process of recovering vanadium comprising treating a vanadium compound solution with a water insoluble carbo-hydrate, thereby forming a vanadium carbo-hydrate combination, separating the vanadium carbo-hydrate from the mixture, drying and incinerating the same.

4. A process of recovering vanadium comprising treating a vanadium sulphate solution with a water insoluble carbo-hydrate, thereby forming a vanadium carbo-hydrate combination.

5. A process of recovering vanadium from calcium phosphate rock comprising treating the finely ground phosphate rock to liberate the phosphoric acid and to convert the vanadium contained in the phosphate rock into water soluble compound, separating the base metal compounds with the exception of the alkali metal compounds from the mixture, and treating the mixture with carbo-hydrate to form a vanadium carbo-hydrate.

6. A process of recovering vanadium from crude phosphate rock comprising treating the finely ground phosphate rock with ammonium nitrate, water and sulphur dioxide, thereby forming phosphoric acid, calcium sulphate and vanadium sulphate and nitrate, separating the base metal compounds with the exception of the alkali metal compounds from the mixture and treating the mixture with an oxy-cellulose to form a vanadium cellulose.

7. A process of recovering vanadium from crude phosphate rock comprising treating the finely ground phosphate rock with ammonium nitrate, water and sulphur dioxide, thereby forming phosphoric acid, calcium sulphate and vanadium sulphate and nitrate, separating the base metal compounds with the exception of the alkali metal compounds from the mixture, treating the mixture with oxy-cellulose to form a vanadium cellulose, separating the vanadium cellulose from the mixture and incinerating the same, the vanadium being recovered in the form of vanadium oxides.

8. A process of recovering vanadium from ores containing vanadium comprising treating the ore with a suitable solvent to form a soluble vanadium salt, subjecting this soluble salt of vanadium to an oxy-cellulose combination to form a vanadium cellulose.

In testimony whereof I have signed my name to this specification.

HENRY BLUMENBERG, Jr.